(12) United States Patent
Rosen

(10) Patent No.: US 7,945,079 B2
(45) Date of Patent: May 17, 2011

(54) MOTION CORRECTION OF PET IMAGES USING NAVIGATOR DATA ACQUIRED WITH AN MRI SYSTEM

(75) Inventor: Bruce R. Rosen, Lexington, MA (US)

(73) Assignee: The General Hospital Corporation, Boston, MA (US)

( * ) Notice: Subject to any disclaimer, the term of this patent is extended or adjusted under 35 U.S.C. 154(b) by 846 days.

(21) Appl. No.: 11/943,747

(22) Filed: Nov. 21, 2007

(65) Prior Publication Data

US 2008/0137930 A1 Jun. 12, 2008

Related U.S. Application Data

(60) Provisional application No. 60/860,660, filed on Nov. 22, 2006.

(51) Int. Cl.
*G06K 9/00* (2006.01)
(52) U.S. Cl. ......... 382/128; 382/131; 382/132; 382/107
(58) Field of Classification Search .................. 382/107, 382/128, 131, 132
See application file for complete search history.

(56) References Cited

U.S. PATENT DOCUMENTS

| 5,272,343 | A | 12/1993 | Stearns |
| 6,958,605 | B2 | 10/2005 | Dale et al. |
| 7,218,112 | B2 | 5/2007 | Ladebeck et al. |
| 2004/0030246 | A1* | 2/2004 | Townsend et al. ............ 600/427 |
| 2004/0171927 | A1* | 9/2004 | Lowen et al. ................. 600/410 |
| 2006/0058641 | A1 | 3/2006 | Krieg et al. |
| 2006/0237652 | A1* | 10/2006 | Kimchy et al. .......... 250/363.02 |
| 2006/0250133 | A1 | 11/2006 | Krieg et al. |
| 2006/0251312 | A1 | 11/2006 | Krieg et al. |
| 2006/0266947 | A1 | 11/2006 | Krieg et al. |
| 2007/0102641 | A1 | 5/2007 | Schmand et al. |

FOREIGN PATENT DOCUMENTS

| WO | 03/003038 A1 | 1/2003 |
| WO | 2006/111869 A2 | 10/2006 |

OTHER PUBLICATIONS

Wong et al, "Motion Tracking and Radionuclide Imaging", Nuclear Science Symposium Conference Record, 2003 IEEE, vol. 4, Digital Object Identifier: 10.1109/NSSMIC.2003.1352424 Publication Year: 2003, pp. 2609-2612 vol. 4.*

Sang-Keun Woo, Hiroshi Watabe, Yong Choi, Kyeong Min Kim, Chang Choon Park, Peter M. Bloomfield, and Hidehiro Iida, "Sinogram-Based Motion Correction of PET Images Using Optical Motion Tracking System and List-Mode Data Acquisition", IEEE Transactions on Nuclear Science, vol. 51, No. 3, Jun. 2004.

(Continued)

*Primary Examiner* — Tom Y Lu
(74) *Attorney, Agent, or Firm* — Quarles & Brady LLP

(57) ABSTRACT

A method for correcting subject motion in positron emission tomography (PET) imaging includes acquiring navigator signals from the subject with a magnetic resonance (MR) imaging system. The navigator signals are used to determine subject motion during a PET scan relative to a reference position and corrective values therefrom. Sinogram data acquired during the PET scan can then be corrected using the corrective values. PET images are then reconstructed from the corrected sinogram data.

8 Claims, 8 Drawing Sheets

OTHER PUBLICATIONS

Adrian J. Chung, Paolo G. Camici, and Guang-Zhong Yang, "List-Mode Affine Rebinning for Respiratory Motion Correction in PET Cardiac Imaging", MIAR 2006, LNCS 4091, pp. 293-300, 2006, Royal Society/Wolfson Foundation MIC Laboratory, MRC Clinical Sciences Centre, Imperial College, London, UK., Spring-Verlage Berlin Heidelberg 2006.

A.J. Lucas, R.C. Hawkes, R.E. Ansorge, G.B Williams, R.E. Nutt, J.C. Clark, T.D. Fryer, and T.A. Carpenter, "Development of a Combined microPET-MR System", Technology in Cancer Research and Treatment, ISSN 1533-0346, vol. 5, No. 4, Aug. 2006, Adenine Press (2006).

* cited by examiner

MOTION CORRECTION OF PET IMAGES USING NAVIGATOR DATA ACQUIRED WITH AN MRI SYSTEM

CROSS-REFERENCE TO RELATED APPLICATIONS

This application claims the benefit of U.S. Provisional patent application Ser. No. 60/860,660 filed on Nov. 22, 2006, and entitled "Motion Correction Of PET Image Using Navigator Data Acquired With An MRI System".

BACKGROUND OF THE INVENTION

The field of the invention is positron emission tomography (PET) imaging systems, and particularly PET imaging systems used in combination with a magnetic resonance imaging (MRI) system.

Positrons are positively charged electrons which are emitted by radionuclides that have been prepared using a cyclotron or other device. These are employed as radioactive tracers called "radiopharmaceuticals" by incorporating them into substances, such as glucose or carbon dioxide. The radiopharmaceuticals are administered to a patient and become involved in biochemical or physiological processes such as blood flow; fatty acid and glucose metabolism; and protein synthesis.

As the radionuclides decay, they emit positrons. The positrons travel a very short distance before they encounter an electron, and when this occurs, they are annihilated and converted into two photons, or gamma rays. This annihilation event is characterized by two features which are pertinent to PET scanners—each gamma ray has an energy of 511 keV and the two gamma rays are directed in nearly opposite directions. An image indicative of the tissue concentration of the positron emitting radionuclide is created by determining the number of such annihilation events at each location within the field of view.

A conventional PET imaging system includes one or more rings of detectors which encircle the patient and which convert the energy of each 511 keV photon into a flash of light that is sensed by a photomultiplier tube (PMT). Coincidence detection circuits connect to the detectors and record only those photons which are detected simultaneously by two detectors located on opposite sides of the patient. The number of such simultaneous events indicates the number of positron annihilations that occurred along a line joining the two opposing detectors. Within a few minutes hundreds of million of events are recorded to indicate the number of annihilations along lines joining pairs of detectors in the ring. These numbers are employed to reconstruct an image using well known computed tomography techniques.

Contrary to PET imaging, when a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, $M_z$, may be rotated, or "tipped", into the x-y plane to produce a net transverse magnetic moment $M_t$. A signal is emitted by the excited spins after the excitation signal $B_1$ is terminated, this signal may be received and processed to form an image.

When utilizing these signals to produce images, magnetic field gradients ($G_x$, $G_y$ and $G_z$) are employed. Typically, the region to be imaged is scanned by a sequence of measurement cycles in which these gradients vary according to the particular localization method being used. The resulting set of received NMR signals are digitized and processed to reconstruct the MR image using one of many well known reconstruction techniques.

Many minutes are typically required to accumulate a sufficient number of counts in a PET imaging system in order to reconstruct an image having sufficient SNR to be of clinical value. During that time period the subject of the examination is prone to move at least one or more times. As a result, the image that is reconstructed is often blurred.

SUMMARY OF THE INVENTION

The present invention is directed to a method for correcting subject motion during a PET scan by employing the use of navigator signals acquired with an MRI system substantially contemporaneous to the PET scan.

More specifically, position information is acquired by the MRI system using a navigator pulse sequence and the navigator data is used to calculate corrective values that indicate current subject position relative to a reference position. These corrective values are employed by the PET imaging system to build a sinogram of the coincidence events that depict the subject in the reference position throughout the scan. A PET image is then reconstructed from this sinogram data.

A general object of the invention is to correct for subject motion during a PET imaging session. In order to accomplish this task, MR navigator echoes are acquired contemporaneously with the PET imaging data and the navigator echo data is employed to correct for subject motion that occurred during the imaging session.

DESCRIPTION OF THE PREFERRED EMBODIMENT

Figure 1:
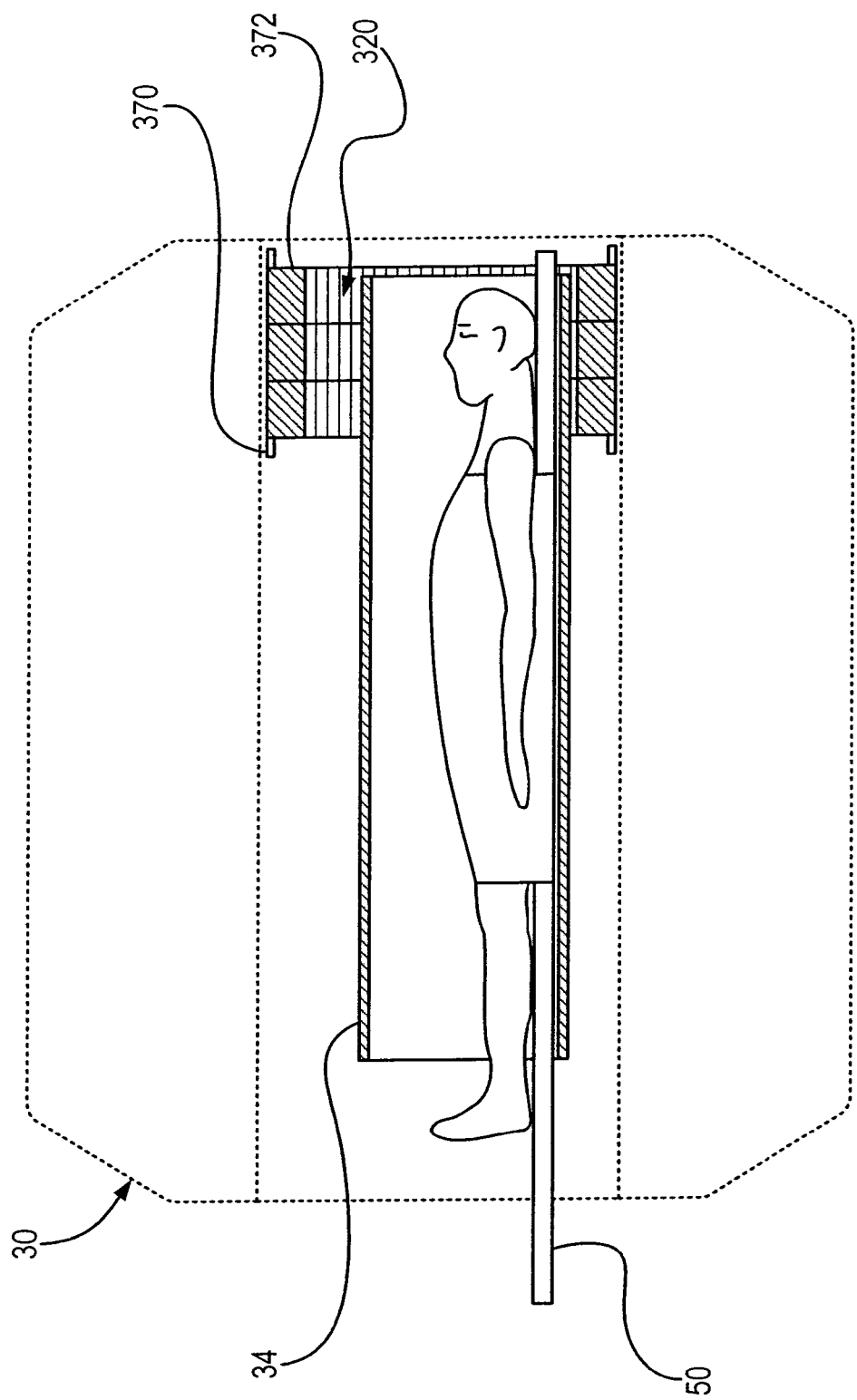
FIG. 1 is a pictorial view of a cross-section of a combination positron emission tomography (PET) imaging system and magnetic resonance imaging (MRI) system which employs the present invention.

Referring to FIG. 1, the preferred embodiment of the present invention is embodied in an MRI system having a cylindrical magnet assembly 30 which receives a subject to be imaged. Disposed within the magnet assembly 30 is a plurality of PET detector rings 372 which are supported by a cylindrical PET gantry 370. Accordingly, each detector ring has an outer diameter dimensioned to be received within the geometry of the MRI scanner. In an alternate embodiment a single PET detector ring may be utilized. A patient table 50 is provided to receive a patient to be imaged. The gantry 370 is slidably mounted on the patient table 50 such that its position can be adjusted within the magnet assembly 30 by sliding it along the patient table 50. An RF coil 34 is employed to acquire MR signal data from a patient and is positioned between the PET detector rings 372 and the patient to be imaged. PET and MR data acquisitions are carried out on the patient, either simultaneously, in an interlaced or interleaved manner, or sequentially. Combined PET/MR imaging systems have been described, for example, in U.S. Pat. No. 7,218,112 and in U.S. Patent Application No. 2007/0102641, which are incorporated herein by reference.

Figure 2:
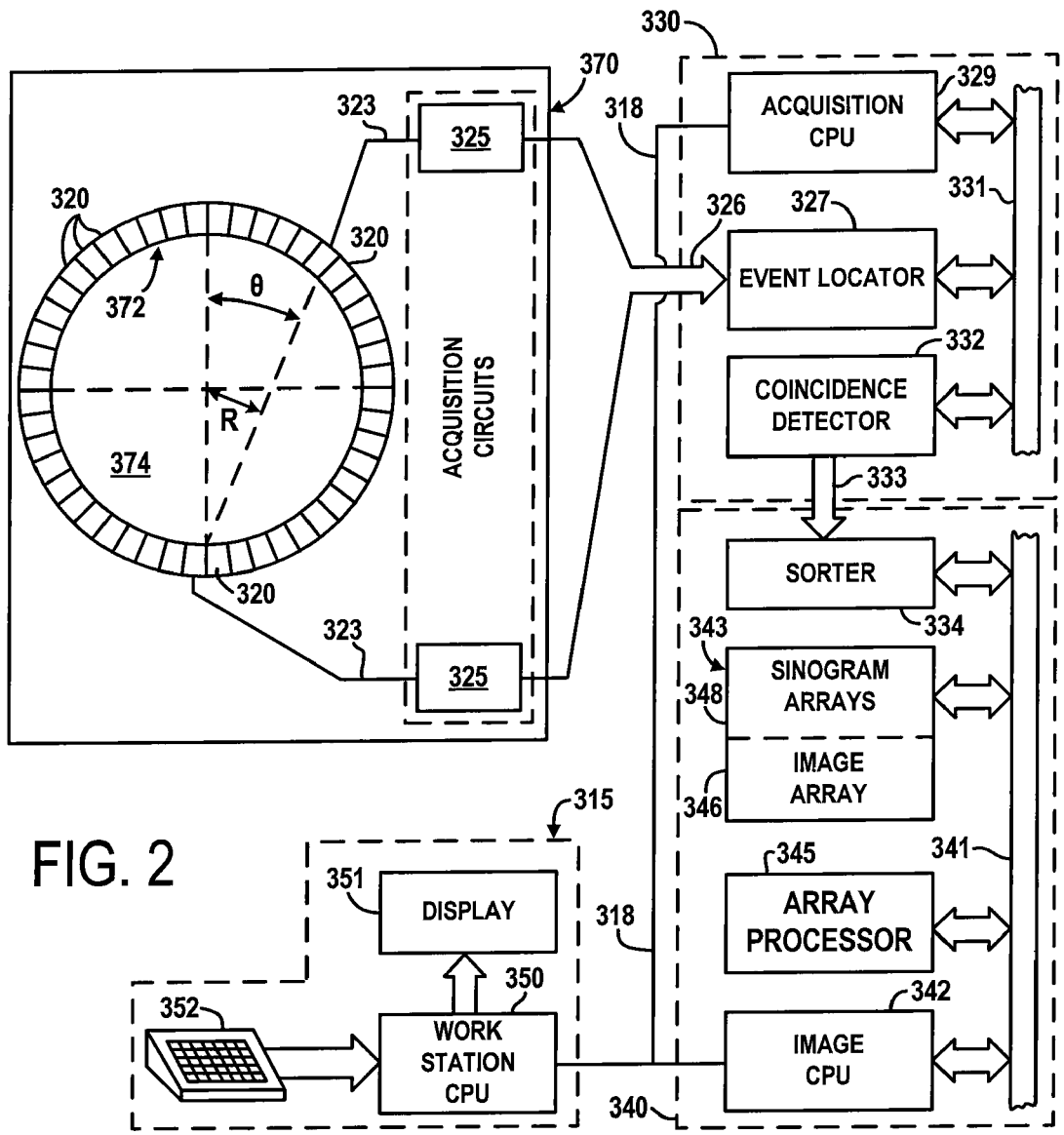
FIG. 2 is a schematic diagram of the PET imaging system portion of the system of FIG. 1.
Figure 3:
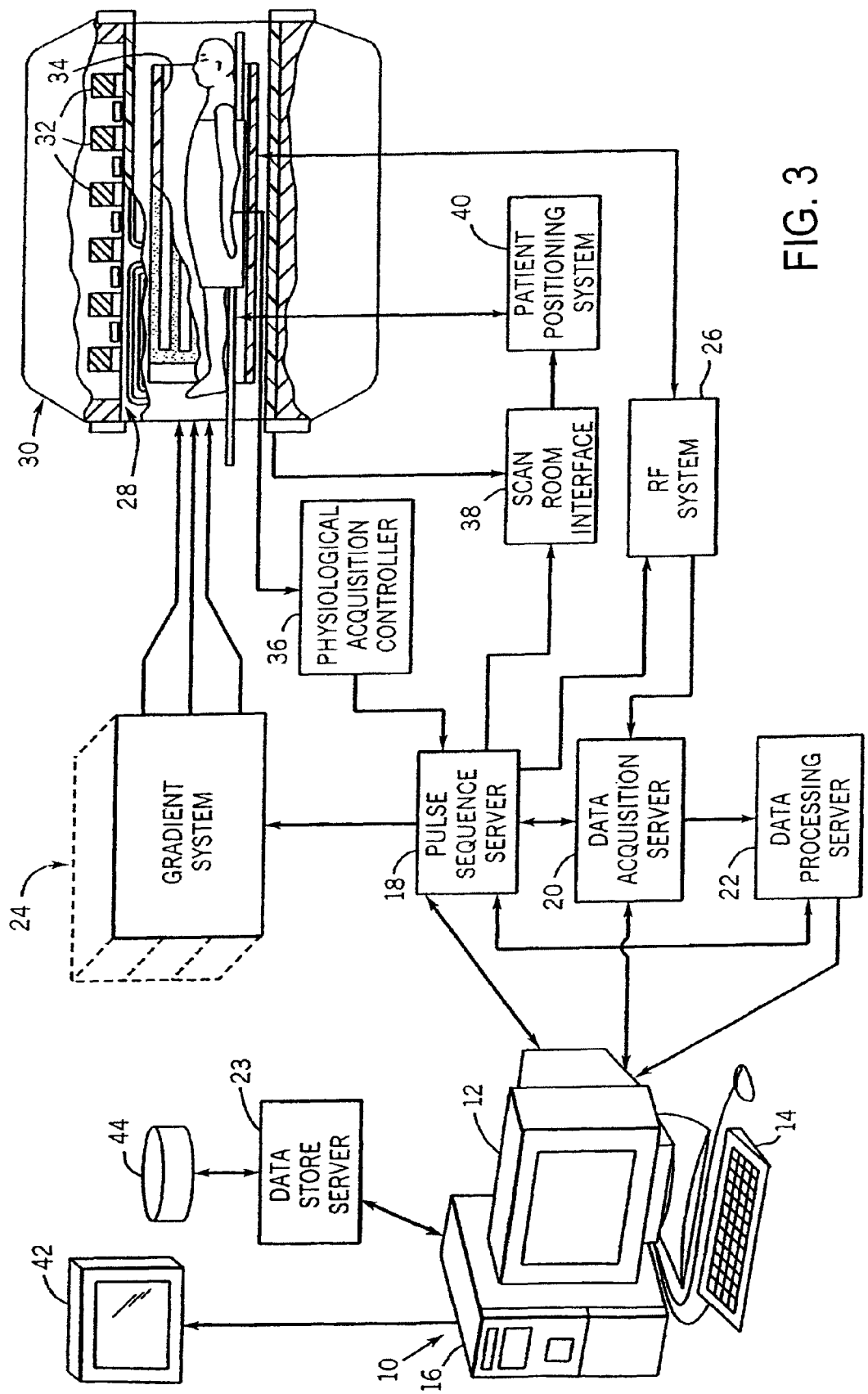
FIG. 3 is a schematic diagram of the MRI system portion of the system of FIG. 1.

The MRI magnet assembly 30 is connected to an MRI system which is shown in more detail in FIG. 3. The detector rings 372 are connected to a PET system which is described in more detail in FIG. 2.

Referring particularly to FIG. 3, The MRI system includes a workstation 10 having a display 12 and a keyboard 14. The workstation 10 includes a processor 16 which is a commercially available programmable machine running a commercially available operating system. The workstation 10 provides the operator interface which enables scan prescriptions to be entered into the MRI system.

The workstation 10 is coupled to four servers: a pulse sequence server 18; a data acquisition server 20; a data processing server 22, and a data store server 23. In the preferred embodiment the data store server 23 is performed by the workstation processor 16 and associated disc drive interface circuitry. The server 18 is performed by separate processor and the servers 20 and 22 are combined in a single processor. The workstation 10 and each processor for the servers 18, 20 and 22 are connected to an Ethernet communications network. This network conveys data that is downloaded to the servers 18, 20 and 22 from the workstation 10, and it conveys data that is communicated between the servers.

The pulse sequence server 18 functions in response to instructions downloaded from the workstation 10 to operate a gradient system 24 and an RF system 26. Gradient waveforms necessary to perform the prescribed scan are produced and applied to the gradient system 24 which excites gradient coils in an assembly 28 to produce the magnetic field gradients $G_x$, $G_y$, and $G_z$ used for position encoding NMR signals. The gradient coil assembly 28 forms part of a magnet assembly 30 which includes a polarizing magnet 32 and a whole-body RF coil 34.

RF excitation waveforms are applied to the RF coil 34 by the RF system 26 to perform the prescribed magnetic resonance pulse sequence. Responsive NMR signals detected by the RF coil 34 are received by the RF system 26, amplified, demodulated, filtered and digitized under direction of commands produced by the pulse sequence server 18. The RF system 26 includes an RF transmitter for producing a wide variety of RF pulses used in MR pulse sequences. The RF transmitter is responsive to the scan prescription and direction from the pulse sequence server 18 to produce RF pulses of the desired frequency, phase and pulse amplitude waveform. The generated RF pulses may be applied to the whole body RF coil 34 or to one or more local coils or coil arrays.

The RF system 26 also includes one or more RF receiver channels. Each RF receiver channel includes an RF amplifier that amplifies the NMR signal received by the coil to which it is connected and a quadrature detector which detects and digitizes the I and Q quadrature components of the received NMR signal. The magnitude of the received NMR signal may thus be determined at any sampled point by the square root of the sum of the squares of the I and Q components:

$$M=\sqrt{I^2+Q^2},$$

and the phase of the received NMR signal may also be determined:

$$\phi=\tan^{-1} Q/I.$$

The pulse sequence server 18 also optionally receives patient data from a physiological acquisition controller 36. The controller 36 receives signals from a number of different sensors connected to the patient, such as ECG signals from electrodes or respiratory signals from a bellows. Such signals are typically used by the pulse sequence server 18 to synchronize, or "gate", the performance of the scan with the subject's respiration or heart beat.

The pulse sequence server 18 also connects to a scan room interface circuit 38 which receives signals from various sensors associated with the condition of the patient and the magnet system. It is also through the scan room interface circuit 38 that a patient positioning system 40 receives commands to move the patient to desired positions during the scan.

The digitized NMR signal samples produced by the RF system 26 are received by the data acquisition server 20. The data acquisition server 20 operates in response to instructions downloaded from the workstation 10 to receive the real-time NMR data and provide buffer storage such that no data is lost by data overrun. In some scans the data acquisition server 20 does little more than pass the acquired NMR data to the data processor server 22. However, in scans which require information derived from acquired NMR data to control the further performance of the scan, the data acquisition server 20 is programmed to produce such information and convey it to the pulse sequence server 18. For example, during prescans NMR data is acquired and used to calibrate the pulse sequence performed by the pulse sequence server 18. Also, navigator signals are acquired during the scan and used to adjust RF or gradient system operating parameters or to control the view order in which k-space is sampled. And, the data acquisition server 20 may be employed to process NMR signals used to detect the arrival of contrast agent in an MRA scan. In all these examples the data acquisition server 20 acquires NMR data and processes it in real-time to produce information which is used to control the scan. As will be described below, the data acquisition server 20 processes navigator signals produced during the scan and conveys information to the PET scanner which indicates the current position of the subject in the scanner.

The data processing server 22 receives NMR data from the data acquisition server 20 and processes it in accordance with instructions downloaded from the workstation 10. Such processing may include, for example: Fourier transformation of raw k-space NMR data to produce two or three-dimensional images; the application of filters to a reconstructed image; the performance of a backprojection image reconstruction of acquired NMR data; the calculation of functional MR images; the calculation of motion or flow images, etc.

Images reconstructed by the data processing server 22 are conveyed back to the workstation 10 where they are stored. Real-time images are stored in a data base memory cache (not shown) from which they may be output to operator display 12 or a display 42 which is located near the magnet assembly 30 for use by attending physicians. Batch mode images or selected real time images are stored in a host database on disc storage 44. When such images have been reconstructed and transferred to storage, the data processing server 22 notifies the data store server 23 on the workstation 10. The workstation 10 may be used by an operator to archive the images, produce films, or send the images via a network to other facilities.

The MRI system is used according to the present invention to acquire navigator NMR signals that enable the position of the subject in the scanner to be determined. More importantly, the NMR navigator signals enable the movement of the subject from a reference position to be detected during the acquisition of the image. There are many different navigator pulse sequences that can be used to produce the NMR navigator signal, but in the preferred embodiment a two-dimensional orbital navigator pulse sequence is used such as that described in U.S. Pat. No. 5,539,312 which is incorporated herein by reference. The MRI system may be used solely to acquire NMR navigator signals, in which case navigator signals can be produced at a very high temporal rate. On the other hand, the navigator signals may be acquired along with MR image data or spectroscopy data, in which case the navigator pulse sequence is interleaved with image or spectroscopy pulse sequences and is performed less often.

Figure 5:
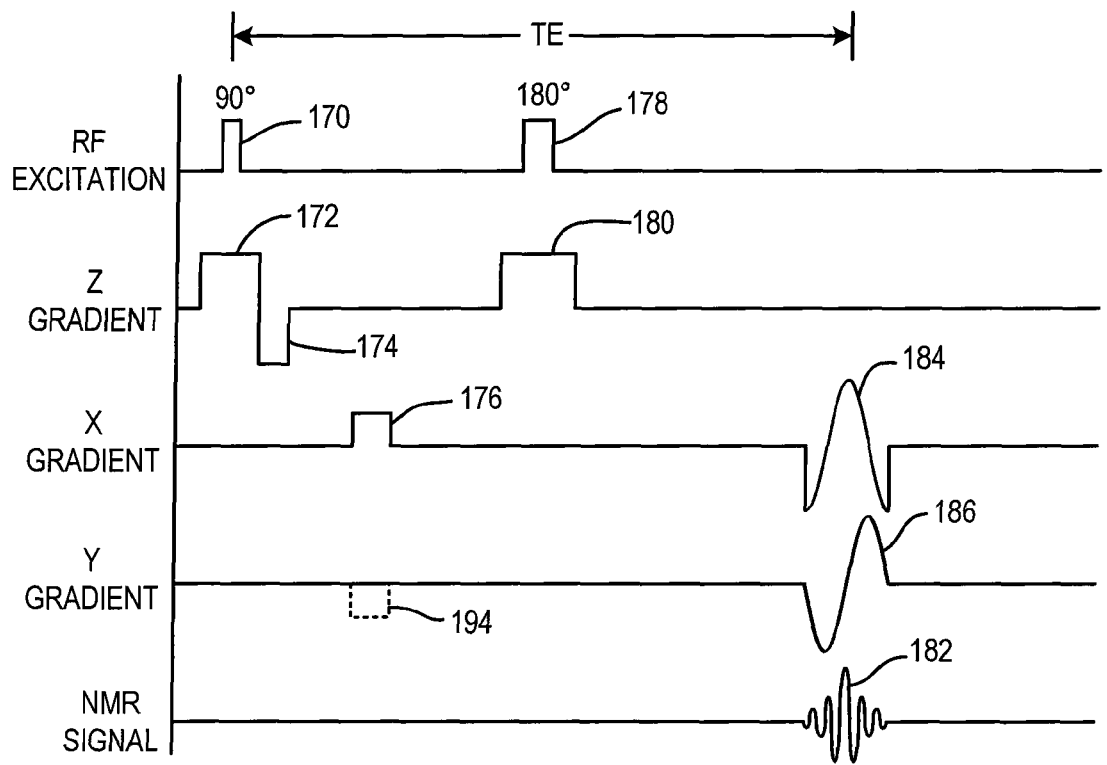
FIG. 5 is a graphic representation of a navigator pulse sequence used by the MRI system of FIG. 3.

Referring particularly to FIG. 5, the preferred embodiment of the orbital navigation pulse sequence is adapted from a spin-echo pulse sequence in which transverse magnetization is produced in a slice by a selective 90 degree RF excitation pulse 170 applied in the presence of a slice select gradient pulse 172. Spins are rephased in conventional fashion by a negative gradient pulse 174 and are dephased by a gradient pulse 176 directed along one in-plane axis (x-axis). A 180 degree selective RF echo pulse 178 is then applied in the presence of a second slice select gradient pulse 180 and an NMR echo signal 182 is acquired at the echo time (TE).

The orbital navigator pulse sequence is characterized by the application of two sinusoidal readout gradients during the NMR echo signal acquisition. More specifically, during the readout of the NMR echo signal 182 the in-plane magnetic field gradient $G_x$ is modulated in a cosine waveform 184, and the orthogonal in-plane magnetic field gradient $G_y$ is modulated in a sine waveform 186. Both sinusoidal waveforms 184 and 186 complete one cycle during the readout of the NMR echo signal 182.

Figure 6:
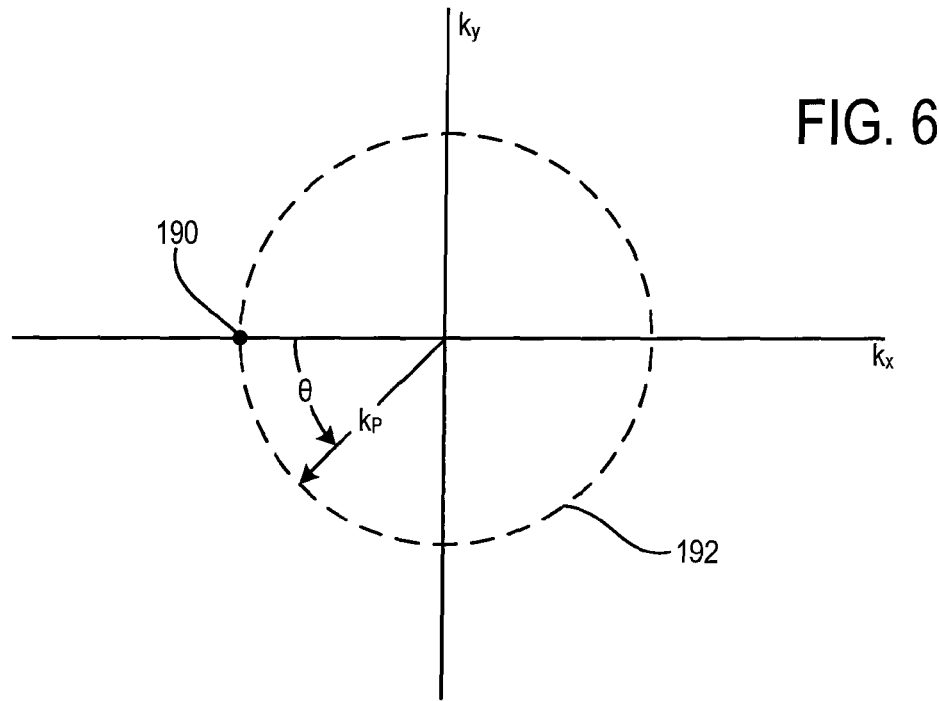
FIG. 6 is a graphic representation of the k-space sampling pattern of the navigator pulse sequence of FIG. 5.

Referring particularly to FIG. 6, as a result of the sinusoidal readout gradients 184 and 186, the NMR echo signal 182 samples a circular path in k-space. The $G_x$ dephasing gradient pulse 176 moves the starting sample point 190 in the negative direction along the $k_x$ axis by an amount $k_p$. The sinusoidal gradient pulses 184 and 186 then move the sample point along a circular path 192 having a radius $k_p$, centered about the origin of k-space. Each sample point on the circular path 192 has an angular position ($\theta$) with respect to the starting point 190, and $\theta$ traverses $2\pi$ radians during the sampling of the "orbital navigator" signal 182. Since the sampling ends at the same starting point 190, no residual phase remains at the end of the orbital navigator pulse sequence.

Figure 7:
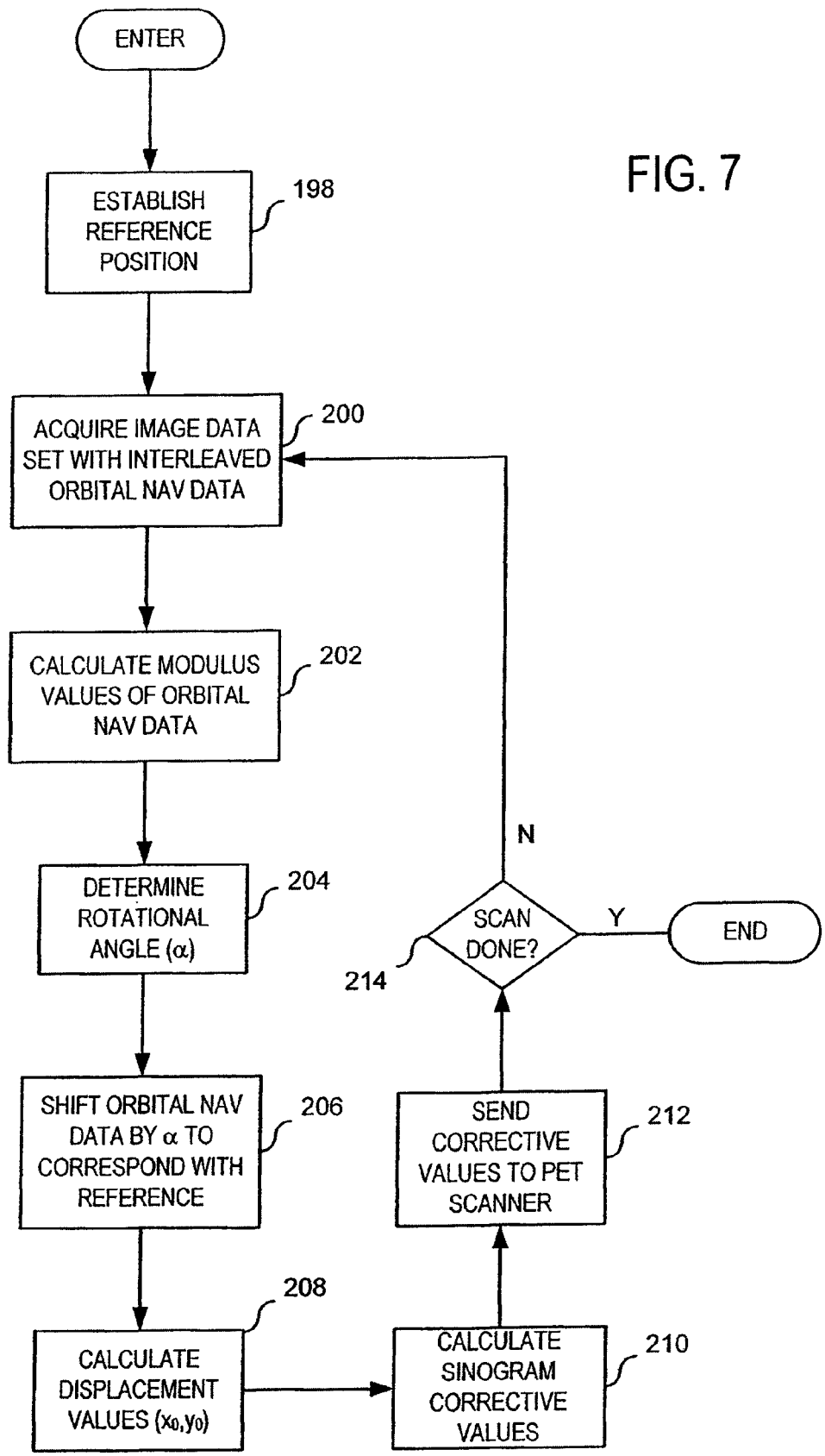
FIG. 7 is a flow chart of one embodiment of the steps performed by the MRI system of FIG. 3 to process the navigator signals and produce corrective values for the PET scanner of FIG. 2.

Referring particularly to FIG. 7, a scan according to the preferred embodiment of the invention is carried out under the direction of a program executed by the acquisition server 20. The first step that is performed is to establish a reference position of the subject being examined as indicated at process block 198. This includes acquiring a navigator signal using the pulse sequence of FIG. 5 and calculating therefrom reference modulus values:

$$S_R(\theta) = \sqrt{I(\theta)^2 + Q(\theta)^2}.$$

These reference modulus values and the k-space samples of the reference navigator signal are saved for later use as discussed below.

As indicated by process block 200, the desired image data is acquired as a series of views using the imaging pulse sequence of choice. Orbital navigator signals are also acquired by interleaving the navigator pulse sequence with the acquired image views. In the most exhaustive use, the navigator pulse sequence may be used alone.

As indicated by process block 202, prior to any transformation, the I and Q values of each acquired orbital navigator signal are used to calculate its corresponding modulus values:

$$S(\theta) = \sqrt{I(\theta)^2 + Q(\theta)^2}.$$

In the preferred embodiment, for example, each orbital navigator signal is comprised of 256 samples and thus a 256 element array of modulus values results.

As indicated by process block 204, the rotational angle ($\alpha$) of each orbital navigator signal with respect to a reference orbital navigator signal $S_R(\theta)$ (i.e. the first one acquired) is determined. This is accomplished by calculating the shift along the $\theta$ axis of the modulus values $S(\theta)$ of each orbital navigator signal relative to the reference $S_R(\theta)$. This is accomplished by shifting the modulus values $S(\theta)$ along the $\theta$ axis until the best fit is found with the reference $S_R(\theta)$. A least squares fit is performed in the preferred embodiment to find the rotation angle ($\alpha$).

As indicated by process block 206, each untransformed orbital navigator signal is then shifted by its corresponding rotational angle ($\alpha$). This effectively removes the effects of object rotation from the orbital navigator signals so that object displacement values ($X_0$, $Y_0$) can be calculated as indicated at process block 208. Displacement is calculated as follows:

$$x_0 = \frac{1}{\pi k_p} \int_0^{2\pi} \Delta \psi \cos\theta d\theta \text{ and } y_0 = \frac{1}{\pi k_p} \int_0^{2\pi} \Delta \psi \sin\theta d\theta$$

where $\Delta\Psi$ is the phase difference between corresponding points in the reference navigator signal and the orbital navigator signal, after the rotation effect ($\alpha$) has been taken into account. A pair of displacement values ($X_0$, $Y_0$) are thus produced from the navigator signal that indicates the translational movement of the subject away from the subject reference position.

As indicated at process block 210 the subject motion values $\alpha$, $X_0$, $Y_0$ resulting from the acquired NMR navigator signal are used to calculate sinogram corrective values. That is, correction data is produced which will change the position of each PET scanner projection ray (R, $\theta$) to "follow" the subject motion, according to the rotational angle ($\alpha$) determined above. Motion correction is performed, for example, by employing a series of affine transformations that rotate and translate each projection ray in accordance with the determined motion values $\alpha$, $X_0$, $Y_0$.

Thus the navigator data is employed such that all the coincidence event counts acquired by the PET scanner are accumulated during the scan as if the subject had not moved from the reference position. It should be apparent to one skilled in the art that the particular navigator pulse sequence that is used will depend on the particular clinical application and the nature of the subject motion to be corrected. For example, a 2D or 3D cloverleaf navigator pulse sequence such as the one disclosed in U.S. Pat. No. 6,958,605, which is herein incorporated by reference, or a spherical navigator pulse sequence such as the one disclosed in U.S. Pat. No. 7,127,092, which is herein incorporated by reference, may be employed to correct for motion of a patient's head during a brain imaging session. It should be appreciated by one skilled in the art that when a 3D navigator pulse sequence is employed, motion correction values for three dimensions, such as three translation values and three rotation values, are determined to correct for subject motion in 3D. In addition, navigator pulse sequences can be employed to various body parts and different organs and organ systems. For example, a navigator pulse sequence could be directed to determine motion correction values for a heart in order to correct for cardiac motion during a PET scan.

As indicated at process block 212, the corrective values are conveyed to the PET scanner data acquisition components as described below, and a check is made at decision block 214 to determine if the scan is completed. If not, the MRI system continues to acquire navigator signals and sends corresponding sinogram corrective values to the PET scanner components. It should be apparent that in this preferred embodiment corrective values are calculated in real time and used by the PET scanner as it acquires a coincidence event sinogram. In the alternative, it is also possible to time stamp the navigator signals acquired during the scan and retroactively correct the coincidence event counts acquired by the PET scanner.

Figure 4:
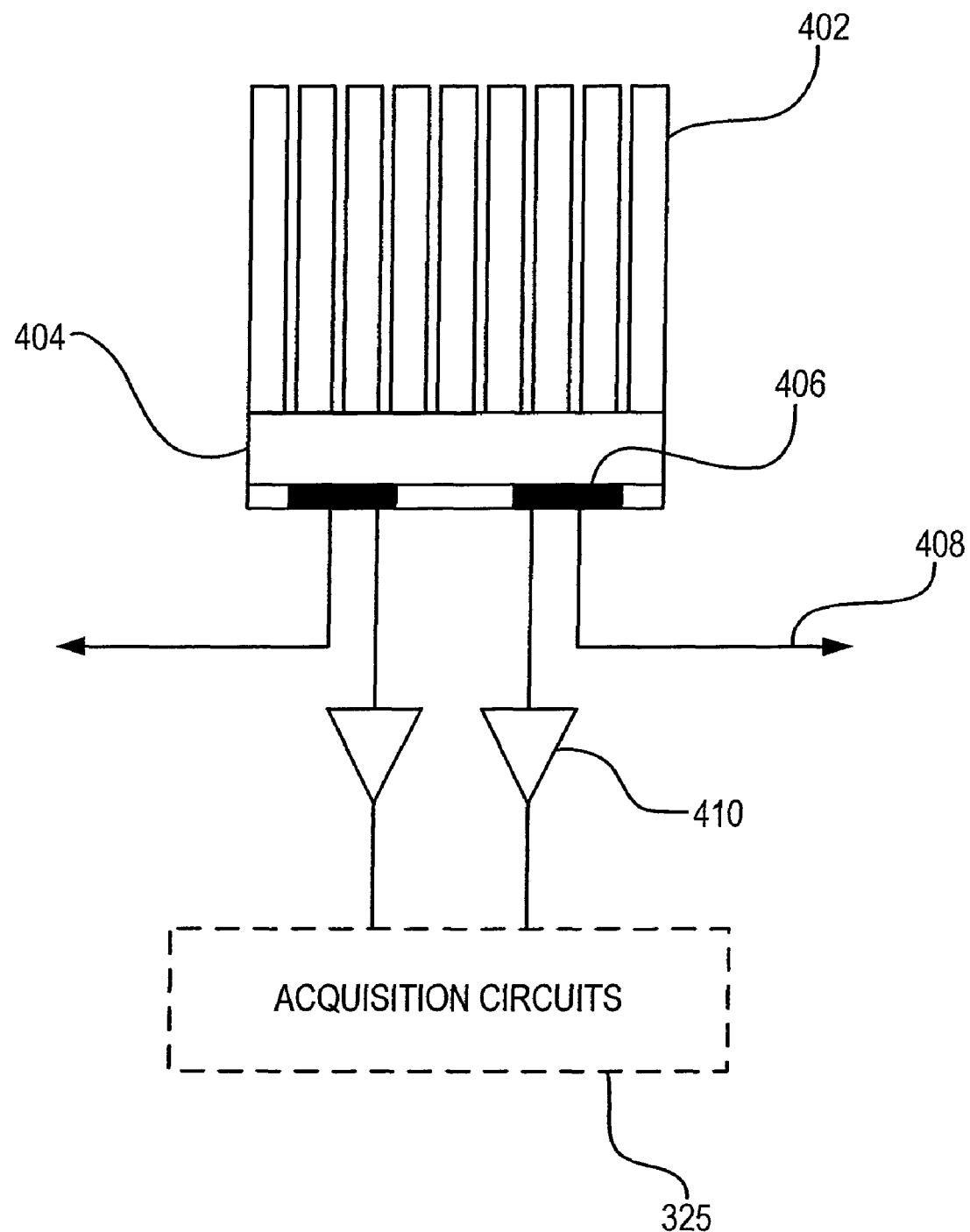
FIG. 4 is a circuit block diagram of the components of a PET detector module incorporated in the PET imaging system of FIG. 2.

Referring particularly to FIG. 2, the PET scanner system includes the gantry 370 which supports the detector ring assembly 372 within the cylindrical bore of the general magnet assembly 30. The detector ring 372 is comprised of detector units 320, which are shown in more detail in FIG. 4. As shown in FIG. 4, the PET detector units 320 include an array of scintillator crystals 402 that are optically coupled through a light guide 404 to a solid state photodetector 406, such as an avalanche photodiode (APD). The scintillators 402 can either be coupled one-to-one with a photodetector 406, or a plurality of scintillators 402 can be coupled to a single photodetector 406. Each photodetector 406 is electrically connected to a high voltage source through an electrical connection 408. A single high voltage source can be connected to a plurality of photodetectors 406 in this manner. The charge created in the photodetectors 406 is collected in a preamplifier 410. The signals produced by the preamplifiers 410 are then received by a set of acquisition circuits 325 which produce digital signals indicating the event coordinates (x, y) and the total energy. Referring now to FIG. 2, these signals are sent through a cable 326 to an event locator circuit 327 housed in a separate cabinet. Each acquisition circuit 325 also produces an event detection pulse (EDP) which indicates the exact moment the scintillation event took place.

The event locator circuits 327 form part of a data acquisition processor 330 which periodically samples the signals produced by the acquisition circuits 325. The processor 330 has an acquisition CPU 329 which controls communications on local area network 318 and a backplane bus 331. The event locator circuits 327 assemble the information regarding each valid event into a set of digital numbers that indicate precisely when the event took place and the position of the scintillator crystal which detected the event. This event data packet is conveyed to a coincidence detector 332 which is also part of the data acquisition processor 330.

The coincidence detector 332 accepts the event data packets from the event locators 327 and determines if any two of them are in coincidence. Coincidence is determined by a number of factors. First, the time markers in each event data packet must be within a preset time of each other, and second, the locations indicated by the two event data packets must lie on a straight line which passes through the field of view (FOV) in the bore of the magnet assembly 30. Events which cannot be paired are discarded, but coincident event pairs are located and recorded as a coincidence data packet.

The coincidence data packets are saved until a set of corrective values are received from the MRI system that reflect the current position of the subject. Using this corrective information and the information in each coincidence data packet, a corresponding set of corrected coincidence data packets is calculated. Each coincidence data packet is thus corrected to change its projection ray, (R, θ) by an amount corresponding to the movement of the subject away from the reference position.

The corrected coincidence data packets are conveyed through a link 333 to a sorter 334 where they are used to form a sinogram. This corrective process is repeated each time corrective values are received from the MRI system. The correction is made on those coincidence data packets that have accumulated since the receipt of the previous corrective values.

The sorter 334 forms part of an image reconstruction processor 340. The sorter 334 counts all events occurring along each projection ray (R, θ) and organizes them into a two dimensional sinogram array 348 which is stored in a memory module 343. In other words, a count at sinogram location (R, θ) is increased each time a corrected coincidence data packet at that projection ray is received. Due to the corrections made to the coincidence events, the sinogram that is formed during the scan depicts the subject being examined in the reference position despite subject motion that occurs during the scan. The image reconstruction processor 340 also includes an image CPU 342 that controls a backplane bus 341 and links it to the local area network 318. An array processor 345 also connects to the backplane 341 and it reconstructs an image from the sinogram array 348. The resulting image array 346 is stored in memory module 343 and is output by the image CPU 342 to the operator work station 315.

The operator work station 315 includes a CPU 350, a CRT display 351 and a keyboard 352. The CPU 350 connects to the local area network 318 and it scans the keyboard 352 for input information. Through the keyboard 352 and associated control panel switches, the operator can control the calibration of the PET scanner and its configuration. Similarly, the operator can control the display of the resulting image on the CRT display 351 and perform image enhancement functions using programs executed by the work station CPU 350.

Figure 8:
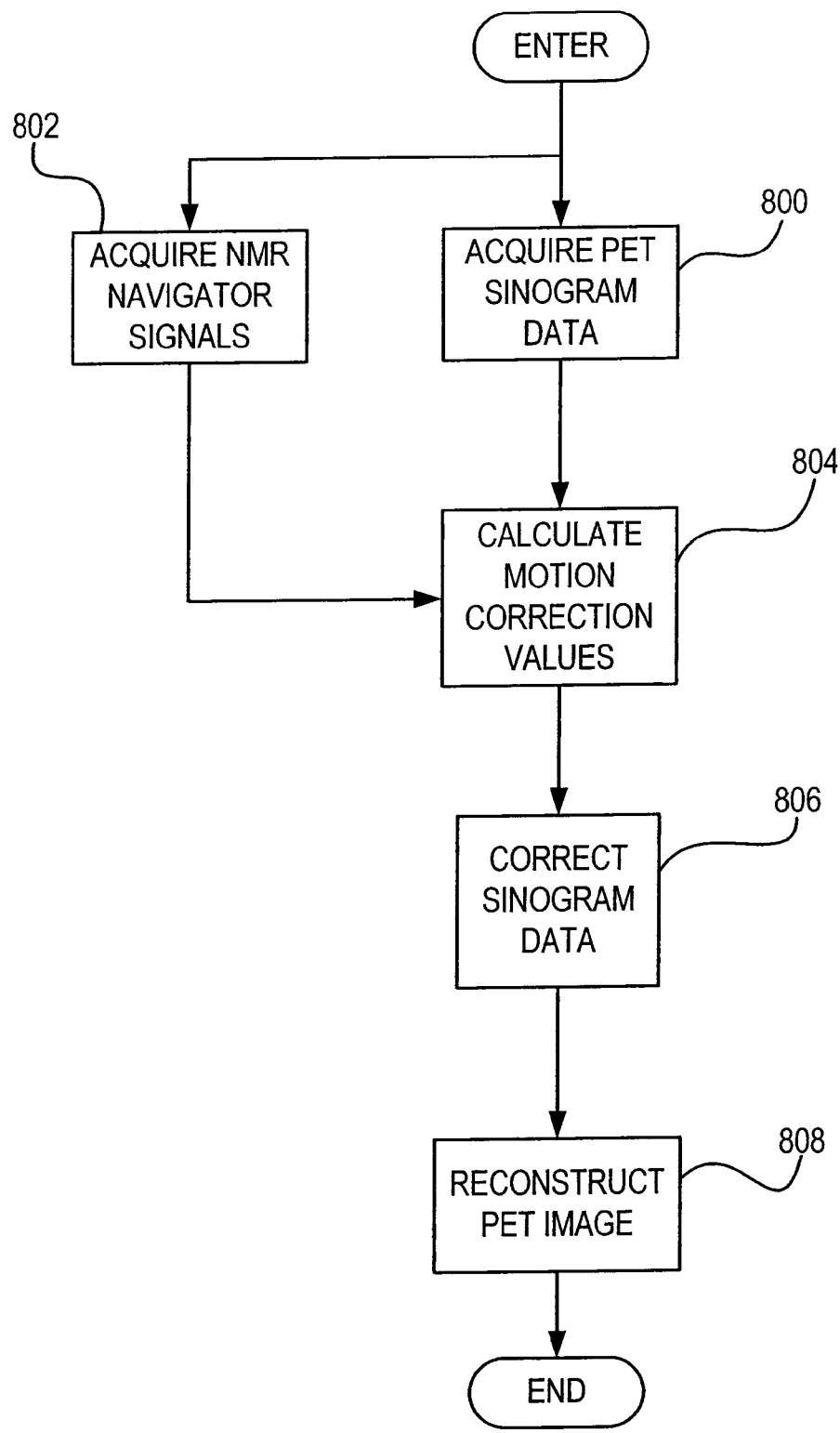
FIG. 8 is a flow chart of one embodiment of the steps performed by the PET system of FIG. 2 and the MRI system of FIG. 3 to acquire and correct image data.

One embodiment of the preferred method for data acquisition, motion correction, and image reconstruction is depicted in FIG. 8. Sinogram data is acquired by the PET scanner in step 800 while navigator signals are acquired using the MRI system in step 802. In the preferred embodiment of the present invention, these two steps occur substantially contemporaneously. Next, motion correction values are calculated in step 804 from the navigator signals acquired in step 802. The motion correction values are then used to retrospectively correct the acquired sinogram data in step 806. In this method, both the navigator signals and sinogram data receive a time stamp when they are acquired such that a navigator signal that is acquired at substantially the same instance in time as a given sinogram is employed to correct for subject motion at that moment in time. After the sinogram data has been corrected for subject motion, PET images are reconstructed in step 808.

Figure 9:
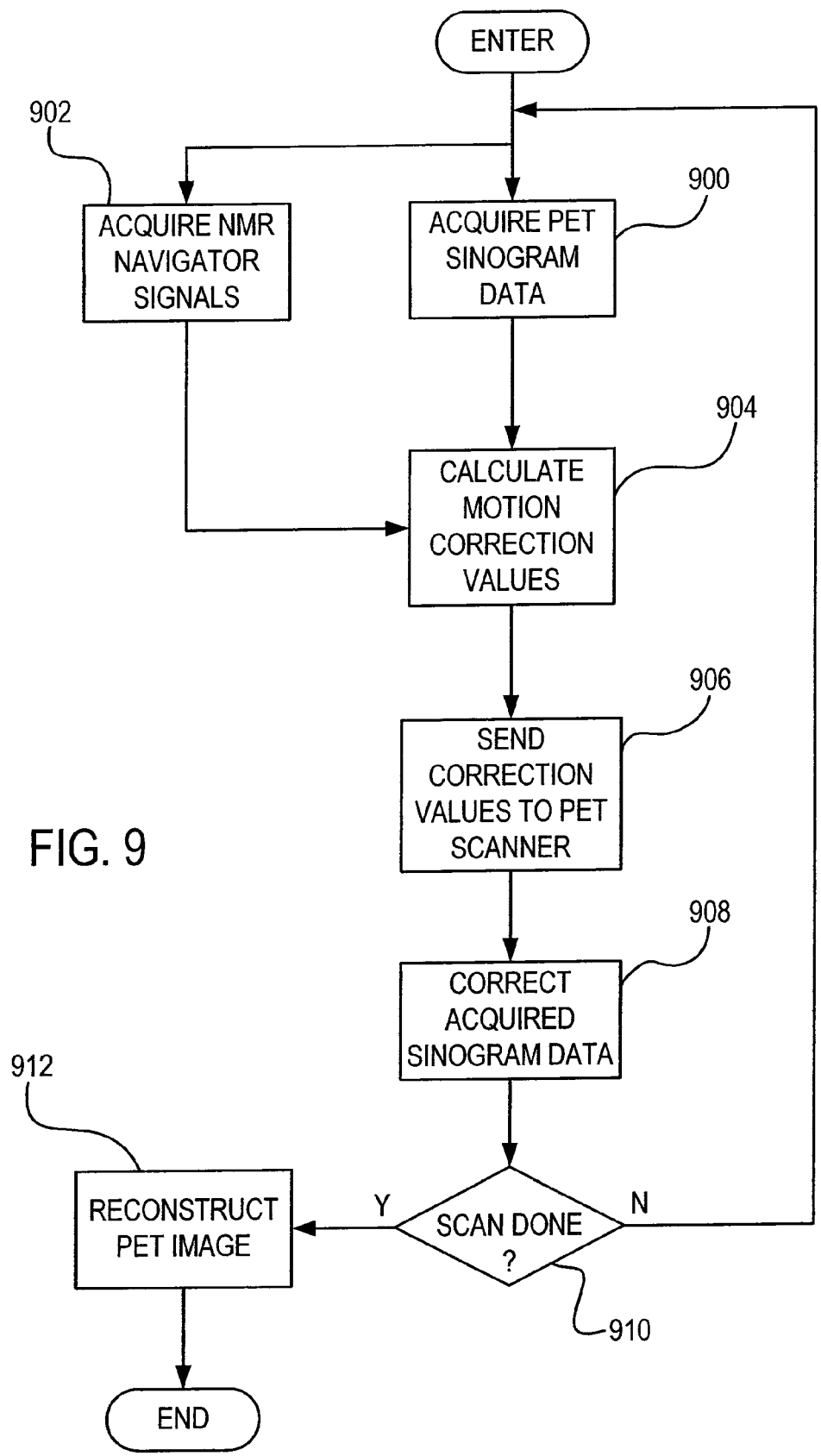
FIG. 9 is a flow chart of an alternative embodiment of the steps performed by the PET system of FIG. 2 and the MRI system of FIG. 3 to acquire and correct image data.

An alternative embodiment of the method for data acquisition is presented in FIG. 9. Similar to the method described above, sinogram data in acquired by the PET scanner in step 900 and navigator signals are acquired in step 902. In the preferred embodiment of the present invention, these two steps occur substantially contemporaneously. Next, motion correction values are calculated in step 904 from the navigator signals acquired in step 902. In this method, the sinogram data are corrected in real-time by sending the motion correction values back to the PET scanner in step 906 such that the acquired sinogram data can be corrected before proceeding with further data acquisition, as shown in step 908. The scan is determined to be completed in step 910 when all of the desired sinogram data has been acquired, at which point PET images are reconstructed from the corrected sinogram data in step 912.

It should be apparent that many variations from the above preferred embodiment are possible without departing from the invention. For example, the MRI system and PET scanner may be more fully integrated with control and processing components being shared by both systems. Also, the detailed structure of the sinogram may be varied.

The invention claimed is:

1. A method for correcting a positron emission tomography (PET) image for subject motion in a combination PET and magnetic resonance imaging (MRI) system, the steps comprising:
   a) administering a radionuclide to a subject to be imaged;
   b) acquiring with the PET scanner sinogram data that counts the number of coincidence events at a plurality of lines of response;
   c) periodically acquiring with the MRI system over a time period that extends concurrently with step b) a plurality of navigator signals from the subject;
   d) calculating from the navigator signals motion correction values;
   e) correcting the sinogram data with the motion correction values; and
   f) reconstructing a PET image from the corrected sinogram data.

2. The method as recited in claim 1 wherein the navigator signals acquired in step c) are produced using a pulse sequence that samples k-space in an orbital trajectory.

3. The method as recited in claim 1 wherein the navigator signals acquired in step c) are produced using a pulse sequence that samples k-space in a three-dimensional trajectory.

4. The method as recited in claim 1 wherein step c) further includes acquiring a reference position navigator signal to establish a reference position.

5. The method as recited in claim 1 wherein step e) comprises correcting the sinogram data by transforming a projection ray in the sinogram data using the motion correction values calculated in step d).

6. The method as recited in claim 1 wherein steps d) and e) are performed as the sinogram data is acquired in step b).

7. The method as recited in claim 1 wherein steps d) and e) are performed after all of the sinogram data has been acquired in step b).

8. The method as recited in claim 7 wherein the time at which the sinogram data acquired in step c) relative to the time at which navigator signals are acquired in step d) is maintained.

\* \* \* \* \*